United States Patent [19]

Broderick

[11] 4,105,131

[45] Aug. 8, 1978

[54] COMBINATION FRONT-END LOADER BUCKET AND REFUSE CONTAINER

[75] Inventor: Ross Thomas Broderick, Dubuque, Iowa

[73] Assignee: Deere & Company, Moline, Ill.

[21] Appl. No.: 833,545

[22] Filed: Sep. 15, 1977

[51] Int. Cl.[2] .............................................. B65G 65/04

[52] U.S. Cl. ................................ 214/315; 214/145 R; 214/774

[58] Field of Search ............... 214/312, 313, 314, 315, 214/316, 317, 318, 145 R, 145 A, 774

[56] References Cited

U.S. PATENT DOCUMENTS

| | | | |
|---|---|---|---|
| 3,148,792 | 9/1964 | Granryd et al. | 214/774 |
| 3,795,331 | 3/1974 | Guest | 214/145 |
| 3,881,617 | 5/1975 | Miller | 214/315 |

*Primary Examiner*—Albert J. Makay

[57] ABSTRACT

The opposite sides of a front-end loader bucket are respectively provided with a pair of oppositely projecting transverse lift pins. A pair of transversely spaced brackets are provided at the backside of a refuse container and each includes a pin bearing surface arranged such that a front-end loader operator may manipulate the bucket to place the pins in lifting contact with the surfaces. The weight of the container causes the latter to tend to pivot downwardly about the pins, however, an abutment structure is located between the brackets and is positioned to engage the bottom of the bucket such as to control movement of the container between upright and dump positions respectively corresponding to roll-back and dump positions of the bucket.

5 Claims, 4 Drawing Figures

FIG. 3
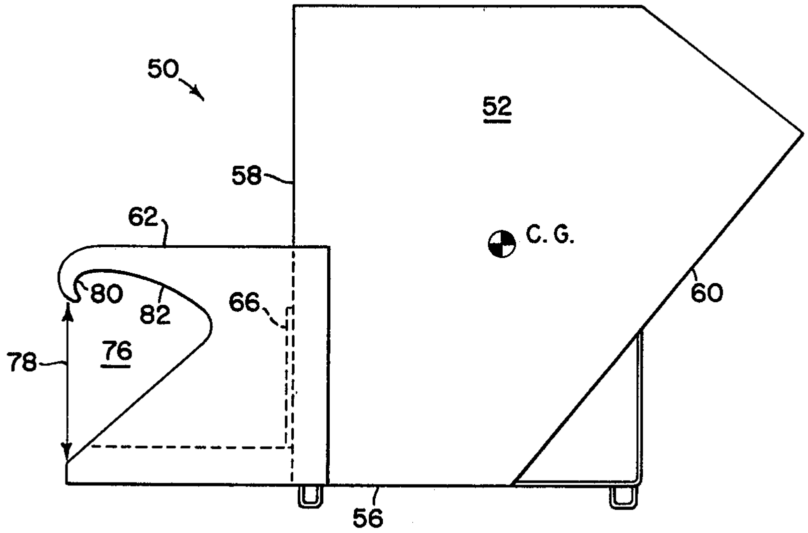
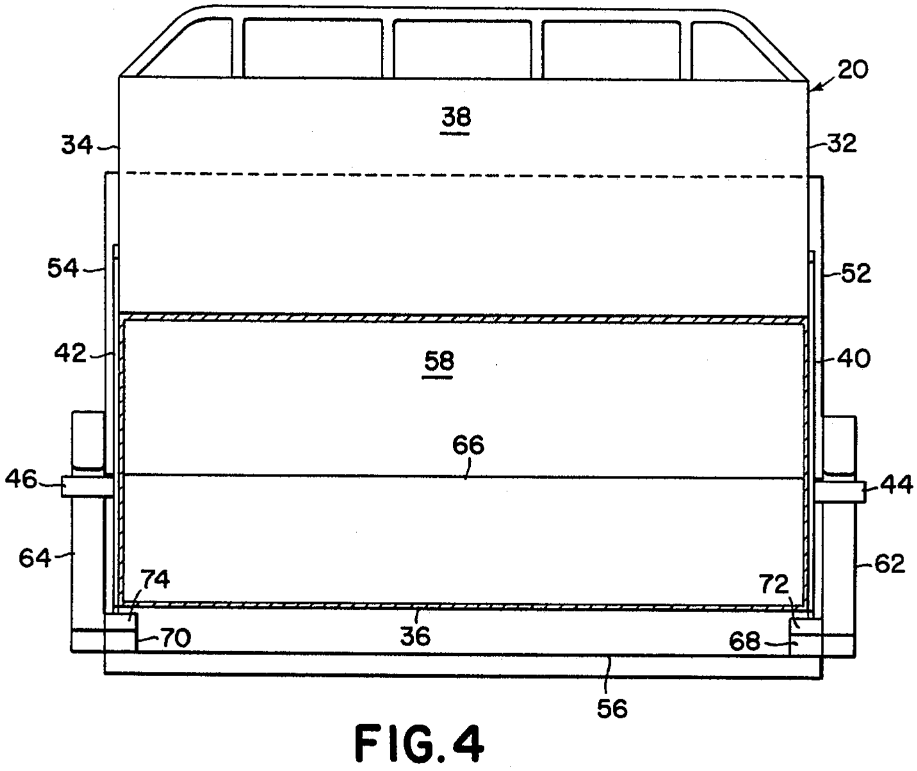
FIG. 4

COMBINATION FRONT-END LOADER BUCKET AND REFUSE CONTAINER

BACKGROUND OF THE INVENTION

The present invention relates to cooperative structures of refuse containers and vehicle-mounted devices for elevating and dumping the containers.

In wide usage today are refuse containers constructed specifically for being handled by the lift mechanism of special refuse trucks having the ability to lift and empty the containers into a refuse receptacle carried by the truck.

This method of handling refuse is relatively efficient in areas where there are sufficient containers to keep the trucks busy throughout a working day. However, there are instances where the use of a container would be desirable even though there are not sufficient numbers of other containers in the area to make it worthwhile to provide a special truck to empty the container.

For example, one location normally removed from areas where refuse containers are plentiful, but being a location where it is desirable that one or more containers be provided, is at the entrances to landfull sites. Containers so located provide a place for individuals to deposit small quantities of refuse so as to obviate the necessity for them to enter the site and subject themselves to the odors and safety hazards which often prevail. However, heretofore the provision of such containers at landfill sites has been quite troublesome to site operators due to the difficulty of emptying the containers without the use of special trucks. Specifically, one way employed for dumping containers has been to connect the container to the bucket of a front-end loader (front-end loaders are commonly used on landfill sites) by means of chains. While this mode of operation works, connecting and disconnecting chains is time consuming and during inclement weather can result in discomfort for the worker, normally the front-end loader operator, who has to perform the task.

SUMMARY OF THE INVENTION

The present invention relates to a novel front-end loader bucket and refuse container combination.

An object of the invention is to provide simple modifications to a conventional front-end loader bucket and to a conventional refuse container, which permit an operator of a front-end loader to engage the container with, and lift and dump the container through raising and manipulation of the loader bucket.

A more specific object is to provide lift pins at the opposite sides of a conventional bucket and to provide the backside of a container with brackets for receiving the pins and an abutment or stabilizer structure for engaging the bottom of the bucket such as to maintain a fixed relationship between the bucket and container.

These and other objects will become apparent from reading the following description in conjunction with the appended drawings.

BRIEF DESCRIPTION OF THE DRAWINGS

FIG. 3 is a right side elevation view of the container.

FIG. 4 is a vertical sectional view taken along the line 4—4 of FIG. 1.

DESCRIPTION OF THE PREFERRED EMBODIMENT

Figure 1:
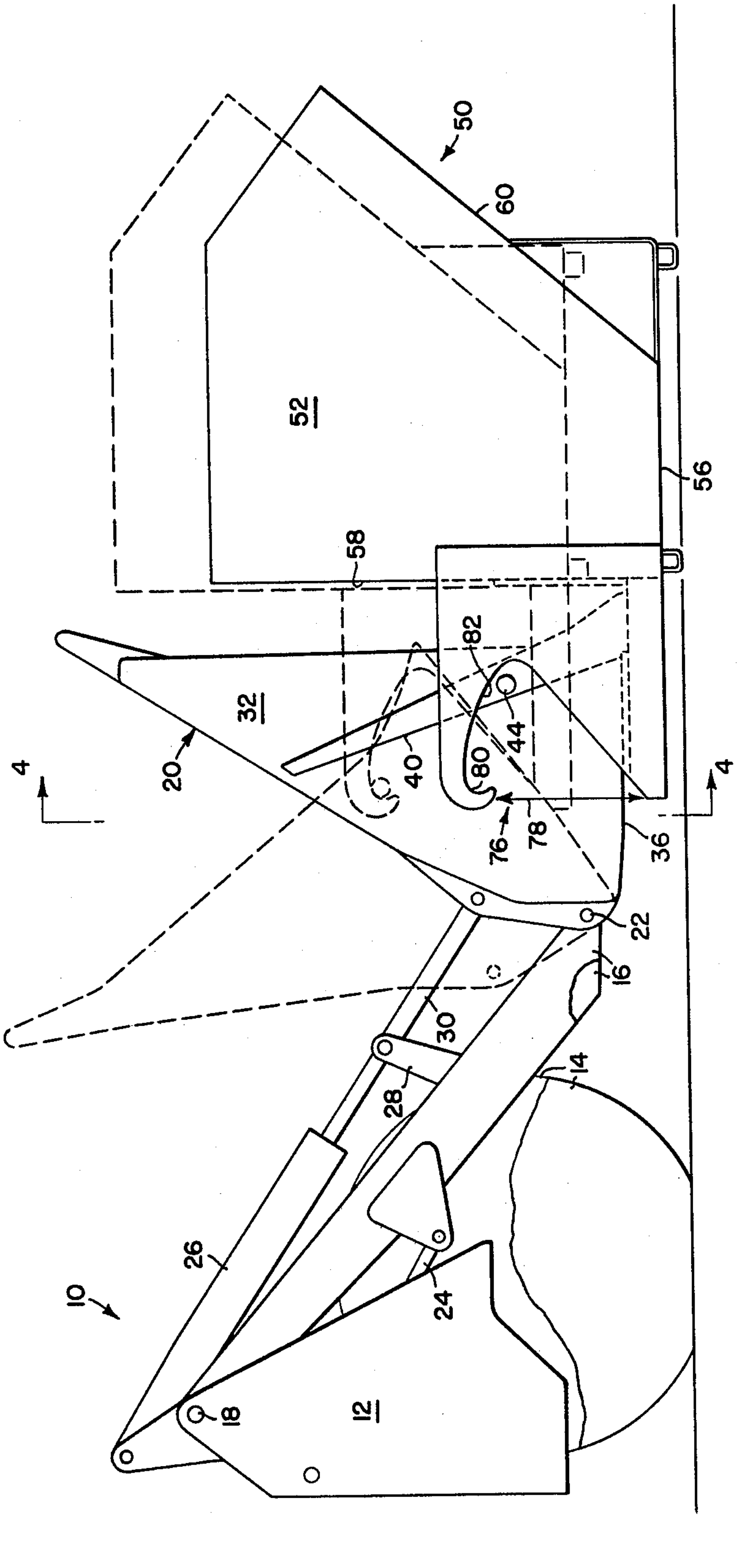
FIG. 1 is a right side elevational view showing the front end portion of a front-end loader and a refuse container, with the loader bucket and the container being illustrated in solid lines in positions they occupy just before engagement of the bucket with or just after disengagement of the bucket from the container, and illustrated in dashed lines in positions they occupy when the bucket is engaged with the container and rolled back to lift the container off the ground.

Referring now to the drawings, therein is shown a forward portion of a front-end loader 10 comprising a frame section 12 supported on a pair of ground wheels 14. A pair of bucket lift arms 16 have their rear ends pivotally connected to the frame 12 as at 18, and their forward ends pivotally connected to a bucket 20, as at 22 (only right pivot connections are shown). Provided for selectively controlling the raising and lowering of the arms 16 are a pair of extensible and retractable actuators 24 having their opposite ends respectively pivotally connected to the frame 12 and lift arms 16; and provided for selectively pivoting the bucket 20 between roll-back and dump position, as respectively illustrated in solid and dashed lines in FIG. 2, about an axis defined by the pins 22 is a powered bucket tilt linkage comprising an extensible and retractable actuator 26 having one end pivotally connected to the frame 12 and an opposite end pivotally connected to a rock arm 28. The rock arm 28 is swingable about a pivot axis defined by a pivot connection with a cross member (not shown) joining the arms 16. A motion transfer link 30 has its opposite ends pivotally connected to the rock arm 28 and the bucket 20.

The bucket 20 includes right and left vertical side walls 32 and 34, respectively, joined by bottom and rear walls 36 and 38. Forming part of the side walls 32 and 34 are reinforcing bars 40 and 42 to which axially aligned, oppositely projecting transverse container lift pins 44 and 46 are secured, as by weldments.

Figure 2:
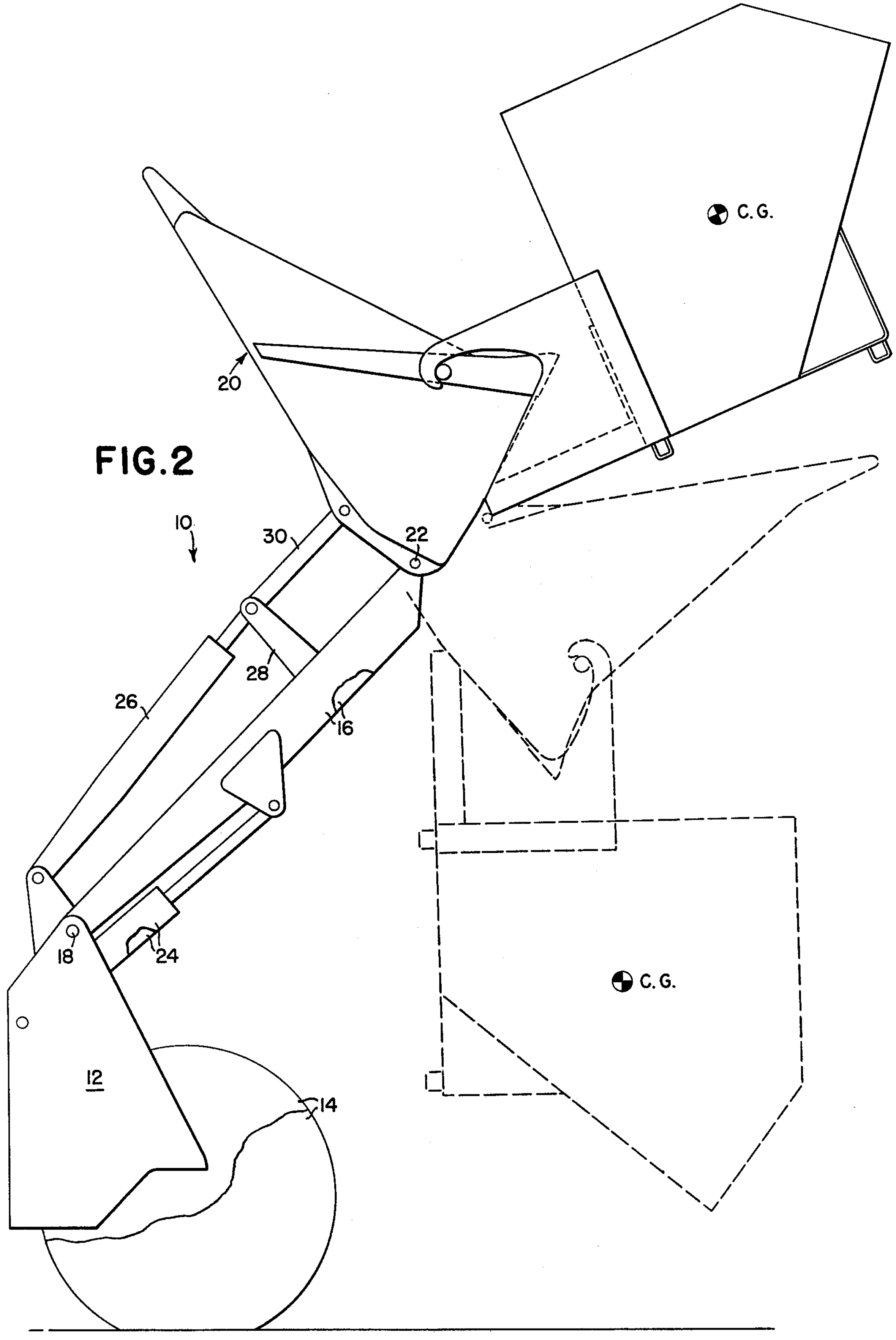
FIG. 2 is a view similar to FIG. 1 but illustrating the bucket and container in solid lines in positions they occupy when the bucket is fully raised and rolled back and illustrating the bucket and container in dashed lines in positions they occupy when the bucket is fully raised and dumped.

Positioned forwardly of the front-end loader 10 (FIG. 1) is a refuse container 50 including opposite vertical side walls 52 and 54 joined by bottom, rear and front walls 56, 58 and 60, respectively, the front wall being inclined upwardly and forwardly from rear to front when the container is in a generally upright condition, as illustrated in solid lines in FIG. 1 and 2 which results in the front wall being inclined downwardly to assist in emptying the containers when the latter is moved to a dump position, as illustrated in dashed lines in FIG. 2.

Fixed to the lower rear margins of the side walls 52 and 54 are right and left brackets 62 an 64, which extend rearwardly beyond the rear wall 58. The brackets 62 and 64 are defined by a pair of generally rectangular, vertically disposed plates, which are spaced apart a distance slightly greater than the width of the bucket 20 so that the latter may be easily positioned therebetween. A reinforcing plate 66 is fixed to the rear wall 58 and has its opposite ends fixed to the brackets 62 an 64. Right and left abutment or support members 68 and 70, which may be formed from tubular or channel stock, are respectively fixed, in fore-and-aft disposition, to the inner faces of the brackets 62 and 64 adjacent the lower edges thereof. The forward ends of the members 68 and 70 are defined by bucket contact surfaces 72 and 74, which are inclined upwardly and rearwardly from forward ends thereof.

Extending forwardly from the rear edge of each of the brackets 62 and 64 is a relatively large notch 76 having upper and lower surfaces which converge forwardly from an entrance 78, with the upper surface defining an arcuate, forwardly facing pin receptacle 80 located above and just forwardly of the entrance 78, and a curved, downwardly facing pin guide surface 82 leading to the receptacle from a forward location of the notch.

It is here noted that the center of gravity (C.G.) of the container is so located relative to the pivot pins 44 and 46 that the weight of the container 50 will always tend to keep the latter in engagement with the contact surfaces 72 and 74 of the abutment members 68 an 70 any time the pins are seated in the receptacles 80 and the container is elevated from the ground.

Further, it is to be noted that the abutment members 68 and 70 and the receptacles 80 of the container 50 are so located relative to the pins 44 and 46 and the bottom wall 56 of the bucket that when the bucket is in its roll back position, the container will remain substantially upright throughout the movement between lowered and raised positions as respectively illustrated in FIGS. 1 and 2.

The operation of the invention is as follows. The container 50 will normally be placed to collect refuse at a site adjacent an area where the front-end loader 10 is being operated to perform work, which includes the use of the bucket.

Upon the container 50 becoming filled with refuse, the operator of the loader 10 will drive the latter into position for engaging the container 50 with the bucket 20. Specifically, the operator will center the loader 10 adjacent the rear of the container and manipulate the lift arm and bucket tilt actuators so as to position the bucket 20 high enough for the bottom wall 36 thereof to clear the abutment members 68 and 70 but low enough to dispose the pins 44 and 46 at a level no higher than the entrance 78 of the notches 76. The loader 10 is then driven forwardly to dispose the pins 44 and 46 within the notches 76, as shown in solid lines in FIG. 1. The operator then actuates the tilt actuator 26 to pivot the bucket 20 to its roll-back position shown in dashed lines in FIG. 1. As the bucket 20 is being rolled back, the pins 44 and 46 engage the guide surfaces 82 and move rearwardly therealong until they seat in the receptacles 80 and, during this movement, will initially tilt the container 50 upwardly about a ground-contacting forward portion thereof until the abutment members 68 and 70 engage the bottom of the bucket 20 and will thereafter lift the container from the ground such as to move it to the dashed line position of FIG. 1, wherein the contact surfaces 72 and 74 bear flat against the bottom of the bucket 20.

Once elevated from the ground, the container 50 may be transported to a desired dump area. The container is dumped by first raising it still further above the ground by actuating the lift actuators 24. When fully raised as illustrated in FIG. 2, the container 50 is dumped by actuating the tilt actuator 26 to rotate the bucket to its position illustrated in dashed lines in FIG. 2. As the bucket rotate to its dump position, the container 50, due to the location of its center of gravity with respect to the lift pins 44 an 46, is similarly rotated with the result that the contents thereof spills out.

Once the container is emptied, the operator will again actuate the tilt actuator 26 to roll back the bucket and will lower the lift arms to a safe height for transporting the container. The loader 10 is then driven back to the desired site for locating the container 50 and the latter is placed on the ground by lowering the lift arms 16 still further and by tilting the bucket to its intermediate position shown in solid lines in FIG. 1.

I claim:

1. In a front-end loader bucket and refuse container combination wherein the container and bucket each include rear, bottom and opposite sidewalls, the container in addition includes a front wall and the bucket is adapted to be vertically pivotally connected to the front end of a loader lift arm structure for powered movement between roll-back and dump positions respectively wherein the bottom wall of the bucket, when considered from front to rear, is inclined upwardly and forwardly and is inclined downwardly and forwardly relative to a horizontal reference plane, the improvement comprising: said container having a pair of brackets fixed thereto and extending rearwardly therefrom at locations spaced transversely from each other a distance slightly greater than the distance between the opposite side walls of the bucket; said brackets each defining a downwardly facing pin guide surface and an arcuate, forwardly facing pin receptacle, with the guide surface forming a forward continuation of an upper terminus of the receptacle; abutment member means fixed between the brackets at a level below the pin receptacles; said bucket, as considered in its roll-back position, having a pair of horizontal, axially aligned pins fixed exteriorly to the opposite side walls thereof and engaged with said pin receptacles; and said abutment member means being engaged with the bottom wall of the bucket.

2. The combination defined in claim 1 wherein the abutment member means comprises a pair of members respectively fixed to the pair of brackets.

3. The combination defined in claim 1 wherein each of the pair of brackets comprises a vertically disposed substantially rectangular plate having a rear edge in which is formed a notch, which includes said pin guide surface and said receptacle.

4. The combination defined in claim 1 wherein the center of gravity of the container is located at a higher level than the pins are when the latter are received in the receptacles and the bucket is in its roll-back position whereby the weight of the container will act to cause the latter to follow the movement of the bucket when the bucket is moved between its roll-back and dump positions.

5. In a front-end loader bucket and refuse container combination wherein the bucket and container each include opposite side walls joined by bottom and rear walls, the container in addition including a front wall and wherein the bucket is adapted to be pivotally connected to a pair of lift arms for movement between roll-back and dump positions for respectively disposing the bottom wall, when considered from front to rear, in upwardly and forwardly, and downwardly and forwardly inclined positions and wherein the front wall of the container is, when considered with the container resting on the ground, substantially parallel to the bottom wall of the bucket when the latter is in its roll-back position, the improvement comprising: said container including a bearing surface means; said bucket having lift means fixed thereto and engageable with the bearing surface means to effect lifting of the container when the bucket is lifted; said container including an abutment member means disposed for engaging the bottom wall of the bucket such as to maintain the front wall of the container substantially parallel to the bottom wall of the bucket during movement of the bucket between its roll back and dump positions when the lift means is engaged with the bearing surface means and the bucket is elevated a sufficient distance above the ground to suspend the container free of the ground.

* * * * *